United States Patent [19]

Coffinberry

[11] Patent Number: 5,058,826
[45] Date of Patent: Oct. 22, 1991

[54] SCRAMJET ENGINE HAVING A LOW PRESSURE COMBUSTION CYCLE

[75] Inventor: George A. Coffinberry, West Chester, Ohio

[73] Assignee: General Electric Company, Cincinnati, Ohio

[21] Appl. No.: 471,332

[22] Filed: Jan. 29, 1990

[51] Int. Cl.$^5$ .................. B64D 27/16; B64D 33/02
[52] U.S. Cl. .................. 244/53 R; 244/62; 244/74; 244/53 B; 60/204; 60/39.821; 60/270.1
[58] Field of Search .................. 244/53 R, 62, 53 B, 244/73 R, 74; 60/270.1, 204, 39.821, 39.06

[56] References Cited

U.S. PATENT DOCUMENTS

| | | | |
|---|---|---|---|
| 3,280,565 | 10/1966 | Dugger et al. | 60/270.1 |
| 3,407,603 | 10/1968 | Kelley et al. | 60/204 |
| 3,430,446 | 3/1969 | McCloy . | |
| 3,535,882 | 10/1970 | Tizio et al. | 244/73 R |
| 3,783,616 | 1/1974 | Norman et al. | 60/204 |
| 3,974,648 | 8/1976 | Kepler | 60/204 |
| 4,194,519 | 3/1980 | Baker et al. | 137/15.1 |
| 4,214,442 | 7/1980 | Reingold | 60/270 R |
| 4,369,940 | 1/1983 | Kelly et al. | 244/3.21 |
| 4,381,017 | 4/1983 | Bissinger | 137/15.1 |
| 4,477,039 | 10/1984 | Boulton et al. | 244/53 B |
| 4,817,892 | 4/1989 | Jeneke | 244/15 |
| 4,821,512 | 4/1989 | Guile et al. | 60/270.1 |
| 4,841,724 | 6/1989 | Hall et al. | 60/245 |

OTHER PUBLICATIONS

Hill and Peterson, *Mechanics and Thermodynamics of Propulsion*, Addison Wesley Pub, ©1965, pp. 202-226.
R. A. Jones et al., "Toward Scramjet Aircraft," Feb. 1978, *Astronautics & Aeronautics*, pp. 38-48.

Primary Examiner—Galen Barefoot
Attorney, Agent, or Firm—Jerome C. Squillaro

[57] ABSTRACT

A method of operating a scramjet engine having an improved low pressure combustion cycle is disclosed. Apparatus for carrying out the method is also disclosed. The method includes the steps of providing supersonic compressed airflow to a combustor and supplying fuel to the combustor for generating a fuel/air mixture having a predetermined temperature less than a temperature required for spontaneous ignition of the fuel/air mixture. The method also includes igniting the fuel/air mixture for sustaining recombination reactions of the fuel/air mixture for generating combustion gases. In the preferred embodiment, the fuel/air mixture is ignited by generating a boundary layer of airflow having atomic oxygen and channeling the boundary layer into the combustor for mixing with a portion of the fuel for generating a boundary layer fuel/oxygen mixture subject to spontaneous ignition. The method results in combustion at a relatively low temperature and pressure which is effective for increasing the combustion rate for providing more complete combustion of the fuel/air mixture while additionally providing primary pressure increase in the combustor as compared to an inlet of the scramjet engine.

43 Claims, 2 Drawing Sheets

SCRAMJET ENGINE HAVING A LOW PRESSURE COMBUSTION CYCLE

BACKGROUND OF THE INVENTION

The present invention relates generally to supersonic combustion ramjet engines i.e., scramjets, and, more particularly, to a scramjet engine having an improved combustion cycle.

Ramjet and scramjet engines are known for powering aircraft at high supersonic or hypersonic velocities greater than about Mach 3. Both engines have no components therein which rotate due to airflow thereover such as in conventional turbofan and turbojet gas turbine engines. Instead, ramjet and scramjet engines utilize the supersonic movement of the aircraft in the atmosphere for compressing inlet airflow in the engine wherein it is mixed with fuel, and ignited for generating combustion gases for propelling the aircraft.

Ramjet engines and scramjet engines are fundamentally different in structure and function since a ramjet engine is conventionally designed to operate with subsonic fluid flow therethrough, whereas a scramjet engine is conventionally designed to operate with supersonic fluid flow therethrough. Ramjet engines are typically effective for powering aircraft at supersonic speeds up to about Mach 6 whereas scramjet engines are designed for powering aircraft at flight velocities from about Mach 5 up to about Mach 18 and higher.

Since the scramjet engine channels supersonic fluid flows therethrough and is designed to power aircraft at hypersonic velocities, the scramjet engine must be effective for combusting a fuel/air mixture at relatively high rates. Furthermore, conventional scramjet engines utilize oblique shockwaves from the aircraft to compress in part freestream, or ambient airflow for use in the engine. Such compression is conventionally known as recompression. Recompression of ambient airflow is effective for providing to the scramjet engine supersonic compressed airflow at a pressure of about 12 pounds per square inch absolute (psia) and at static temperatures of about 3000° Rankine (R) after the inlet air has been mixed with a fuel such as hydrogen, for example, for use in the combustor of the scramjet engine.

The static temperature of about 3000° R. is more than adequate for creating spontaneous ignition of the fuel/air mixture in the scramjet engine for initiating and allowing recombination reactions (i.e., combustion) of the fuel/air mixture to occur for generating heat and thrust from the scramjet engine.

The fuel/air mixture is further heated by the recombination heat release and reaches static temperatures of about 5200° R. which is an equilibrium kinetic limit. Above this temperature, the rate of chemical dissociation of the combustion gases would exceed the rate of chemical recombination. Accordingly, combustion is limited by dissociation occurring at a maximum temperature of the combustion process.

Accordingly, chemical heat release, and therefore propulsive energy, are fundamentally limited by the static temperature rise available between the combustor inlet temperature and the equilibrium temperature, thusly providing a limit to the efficiency of operation of the scramjet engine.

It is not believed that a scramjet-powered aircraft has yet been built or flown. However, small research-type scramjet engines have been built and laboratory tested at simulated flight speeds up to about Mach 7. Accordingly, the references herein to conventional and typical scramjets and structures refers to information conventionally known to those skilled in the art of engines for powering aircraft at supersonic velocities, which is based, in part, on mathematical modeling and analysis.

OBJECTS OF THE INVENTION

Accordingly one object of the present invention is to provide a new and improved scramjet engine.

Another object of the present invention is to provide a new and improved method of operating a scramjet engine.

Another object of the present invention is to provide a scramjet engine having an improved combustion cycle.

Another object of the present invention is to provide a scramjet engine effective for obtaining more complete combustion of a fuel/air mixture.

Another object of the present invention is to provide a scramjet engine effective for combusting fuel/air mixtures at a relatively high rate.

SUMMARY OF THE INVENTION

A method and apparatus are disclosed for a scramjet engine having an improved combustion cycle. The method includes the steps of providing supersonic compressed airflow to a combustor, supplying fuel to the compressed airflow in the combustor for generating a fuel/air mixture having a predetermined temperature less than a temperature required for spontaneous ignition of the fuel/air mixture, igniting the fuel/air mixture for sustaining recombination reactions thereof for generating combustion gases, and discharging the combustion gases from the combustor through an exhaust nozzle for generating thrust. In a preferred, exemplary embodiment of the invention, the igniting step is accomplished by generating a boundary layer of air having atomic oxygen which when mixed with a portion of the fuel in the combustor undergoes spontaneous ignition for igniting the fuel/air mixture in the combustor. An apparatus for carrying out the method is also provided.

BRIEF DESCRIPTION OF THE DRAWING

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

DETAILED DESCRIPTION

Figure 1:
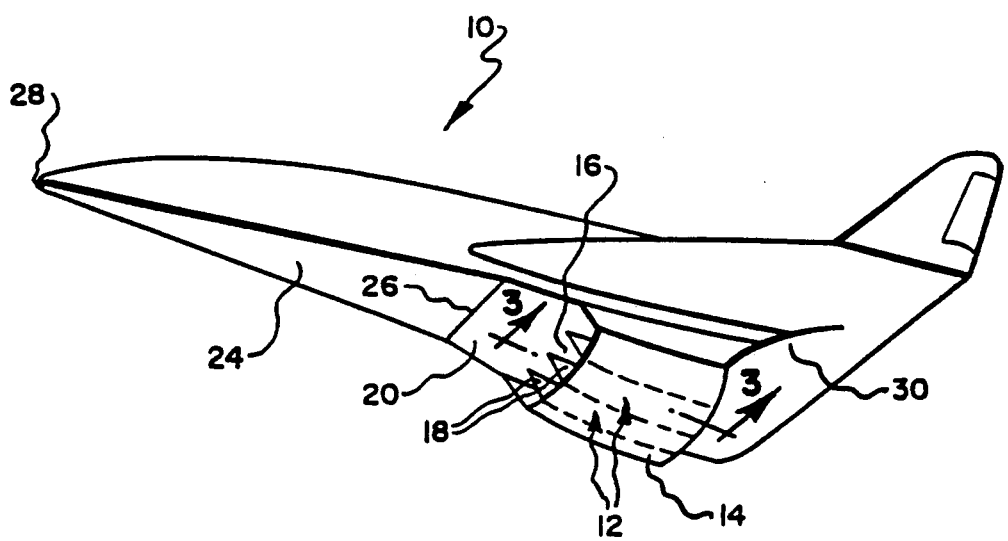
FIG. 1 is a perspective, schematic view of a hypersonic aircraft including four side-by-side scramjet engines in accordance with a preferred embodiment of the present invention.

Illustrated in FIG. 1 is a schematic representation of a hypersonic aircraft 10 including four side-by-side scramjet engines 12 in accordance with a preferred, exemplary embodiment of the present invention. Although four engines 12 are shown, fewer or more engines may be utilized depending upon the particular thrust requirements for the aircraft 10. The scramjet engines 12 are effective for powering the aircraft 10 at hypersonic velocities up to about Mach 18. Each scramjet engine 12 is defined in part by a cowl 14 spaced radially inwardly from a midbody surface 16 of the aircraft 10. A spaced pair of sidewalls 18 extends between the midbody surface 16 and the cowl 14 for defining a generally rectangular scramjet engine 12. The scramjet engines 12 are substantially identical and the further description hereinbelow shall be with reference to one of the engines 12, with the other engines 12 being similar.

Figure 2:
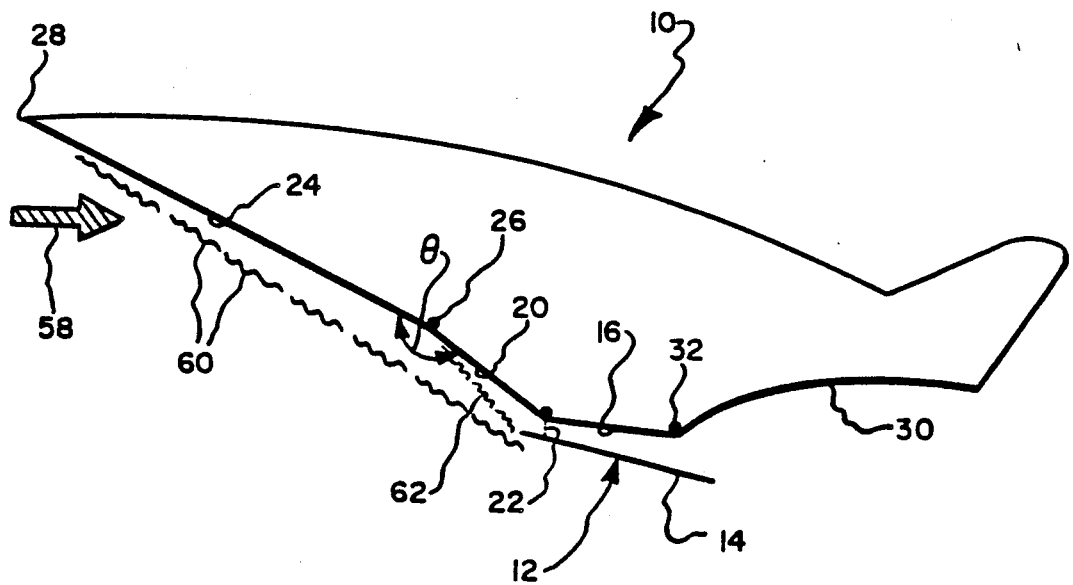
FIG. 2 is a schematic, side view sectional representation of the aircraft illustrated in FIG. 1.

Referring to both FIGS. 1 and 2, the scramjet engine 12 also includes a planar forebody surface 20 extending obliquely upstream from the midbody surface 16 from a throat 22 of minimum flow area defined between the midbody surface 16 and the cowl 14.

In the embodiment illustrated, the scramjet engine 12 is an aircraft-integrated scramjet engine which utilizes surfaces of the aircraft 10 to in part define the scramjet engine 12. Such aircraft surfaces include the midbody surface 16 and the forebody surface 20. The surfaces also include a planar bow surface 24 extending upstream from the forebody surface 20 at an inflection point 26 and at an obtuse angle $\theta$ from the forebody surface 20. The bow surface 24 ends at a leading edge 28 of the aircraft 10. The aircraft surfaces defining the scramjet engine 12 further include an arcuate afterbody surface 30 extending downstream from the midbody surface 16 at an aft end 32 thereof.

Figure 3:
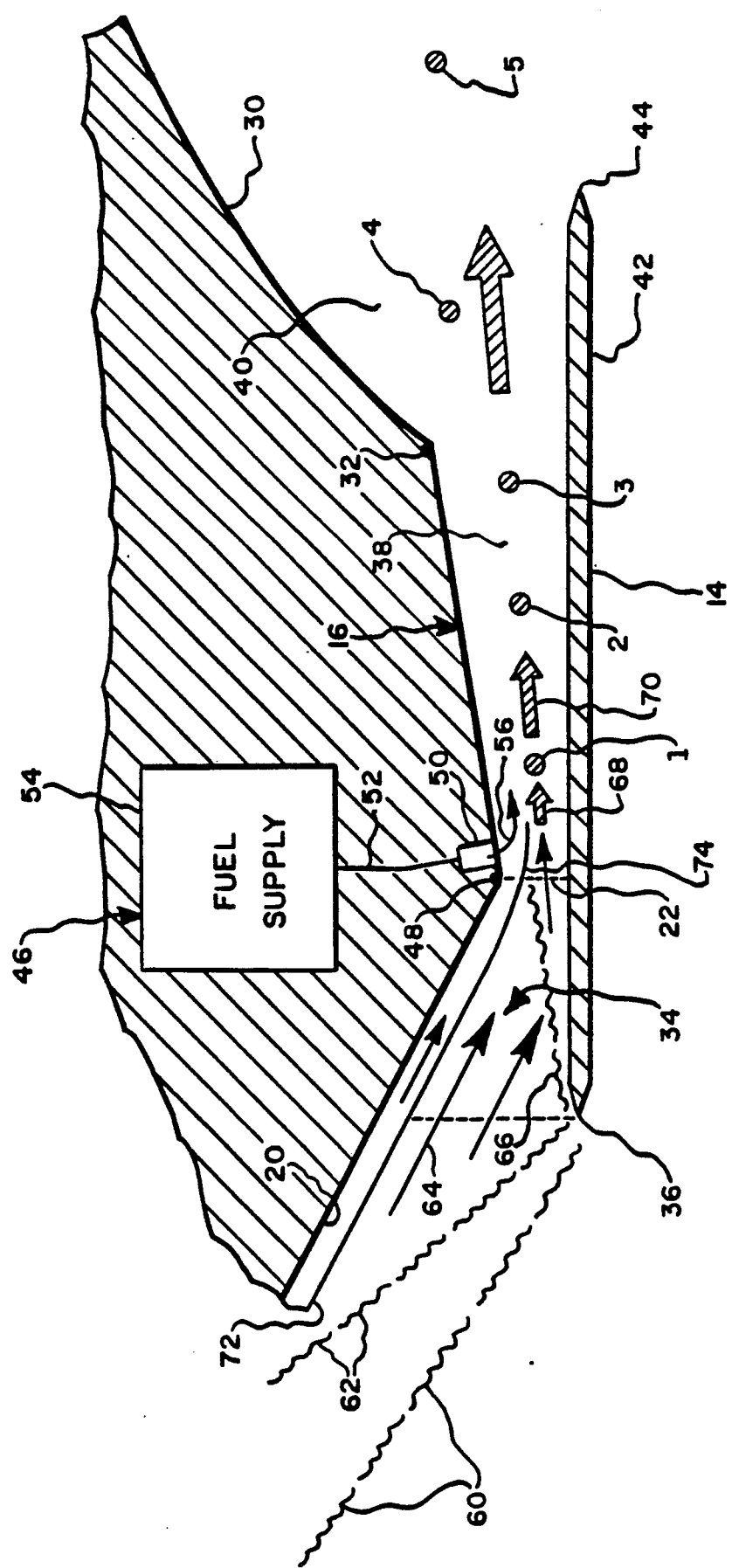
FIG. 3 is an enlarged, sectional, schematic view of a portion of one of the scramjet engines illustrated in FIG. 1 taken along line 3—3.

As illustrated more particularly in FIGS. 2 and 3, the cowl 14 is spaced outwardly from the midbody surface 16 and from portions of the forebody surface 20 and the afterbody surface 30 to define a converging inlet 34 extending from a leading edge 36 of the cowl 14 to the throat 22; a diverging combustor 38 extending downstream from the throat 22, which may also be referred to as the combustor inlet 22, to the midbody surface aft end 32; and a diverging exhaust nozzle 40 extending downstream from the combustor 38 at the aft end 32 and in part defined by an aft end 42 of the cowl 14 extending rearwardly from the plane of the midbody surface aft end 32 to a trailing edge 44 of the cowl 14. The scramjet engine 12 further includes means 46 for supplying fuel to the combustor 38 at an upstream end 48 thereof.

The fuel supplying means 46 includes one or more conventional fuel injectors 50 spaced transversely from each other at the combustor upstream end 48. Conventional fuel conduits 52 join in flow communication a conventional fuel supply 54 including a conventional fuel pump, to the injectors 50. The fuel supplying means 46 is effective for supplying fuel 56 through the injectors 50 into the combustor 38. In the preferred embodiment, the fuel 56 is hydrogen $H_2$, initially supplied in a liquid state, which is relatively cold. As it flows through the conduits 52, it is used to cool adjacent aircraft and engine structures, and thus is heated to a gaseous state for injection into the combustor 38 from the injectors 50.

The scramjet inlet 34 is further bounded in part by both the aircraft forebody surface 20 and bow surface 24 for providing external compression of ambient or freestream airflow 58 in a manner well known. More specifically, the inlet 34, including the forebody surface 20 and the bow surface 24, is predeterminately sized and configured for generating an oblique bow shockwave 60 extending from the aircraft leading edge 28 rearwardly down to the cowl leading edge 36, and an oblique forebody shock 62 extending downstream from the inflection point 26 to the cowl leading edge 36. The bow and forebody shocks 60 and 62 provide external compression, which is also known as recompression, of the ambient airflow 58 for increasing the static pressure thereof with a corresponding increase in static temperature thereof. The ambient airflow 58 so compressed results in supersonic compressed airflow 64 which is channeled into the inlet 34 generally parallel to the forebody surface 20. The airflow 64 obliquely impinges the cowl 14 and generates an oblique cowl shock 66 extending at an acute angle rearwardly from the cowl leading edge 36.

In accordance with a preferred, exemplary embodiment of the present invention, a method of operating the scramjet engine 12 for powering the aircraft 10 includes the steps of providing the supersonic compressed airflow 64 from the inlet 34 to the combustor 38 at a predetermined static temperature and static pressure. As described above, the recompression of the ambient airflow 58 from the bow and forebody shocks 60 and 62 supersonically compresses the airflow 58 to a predetermined static pressure with a corresponding predetermined static temperature. In the embodiment of the invention illustrated in FIGS. 1–3, the inlet 34 comprises a supersonic diffuser which additionally increases the static pressure and correspondingly increases the static temperature of the ambient airflow 58 by internal contraction for providing the supersonic compressed airflow 64 to the combustor 38.

Providing supersonic compressed airflow to a scramjet combustor at predetermined static pressure and temperature is conventional. A conventional inlet, forebody and bow of a hypersonic aircraft is conventionally sized and configured for generating the predetermined static pressure and static temperature of the airflow for providing a relatively large increase in static pressure from the aircraft leading edge 28 to the combustor 38 and a correspondingly high static temperature for obtaining spontaneous ignition of the fuel/air mixture in the combustor.

However, in accordance with the present invention, it has been discovered that substantial improvements in operation of the scramjet engine 12 may be obtained by providing the supersonic compressed airflow 64 to the combustor 38 at a relatively low static temperature, and a correspondingly relatively low static pressure, such temperature being less than a temperature required for spontaneous ignition of a fuel/air mixture 68 formed by the fuel 56 mixing with the airflow 64 at the combustor upstream end 48.

The significance and advantages of the present invention may be more fully appreciated by examination of a typical recombination reaction for releasing heat which may be represented as follows:

$$H + OH + M \rightarrow H_2O + M + 52,000 \text{ BTU/LB.} H_2$$

In the above expression, "M" is a conventionally known third body such as $H_2O$ from the fast ignition reactions described hereinbelow, "H" is atomic hydrogen, "OH" is a conventional hydroxile radical of oxygen and hydrogen which follow from conventional ignition reactions, and "$\rightarrow$" indicates that the left-hand constituents react to form the right-hand constituents either directly or through intermediate reactions.

Accordingly, atomic hydrogen recombines to form water while releasing 52,000 BTU/LB.$H_2$.

The reaction rate may be expressed as follows:

$$d[H_2O]/dt = k[OH][H][M]$$

Where k=constant/$T^2$ and [ ]=molecules per unit volume.

Assuming perfect-gas relations, $$[\;]\alpha P/T$$

Therefore, $$d[H_2O]/dt \alpha P^3/T^5$$

Accordingly, the rate of generation of water molecules per unit volume is directly proportional to pressure cubed and inversely proportional to temperature to the fifth power. This expression, therefore, suggests that the high temperature conventionally obtained for generating spontaneous ignition results in a relatively slow recombination rate.

Accordingly, in order to increase the recombination rate, the method of the present invention includes providing the fuel/air mixture 68 at relatively low static temperature, with a static temperature as low as possible while still being able to operate the scramjet engine 12. In the preferred embodiment, the static temperature of the fuel/air mixture 68 is a predetermined static temperature less than a temperature required for spontaneous ignition of the fuel/air mixture 68. However, without spontaneous ignition, the method in accordance with the present invention provides for igniting the fuel/air mixture 68 for sustaining recombination reactions of the fuel/air mixture for generating combustion gases 70. The method also includes the step of discharging the combustion gases 70 through the exhaust nozzle 40 for generating thrust for powering the aircraft 10.

The desired predetermined static pressure and predetermined static temperature of the compressed airflow 64 may be conventionally obtained by the inlet 34, including the forebody surface 20 and the bow surface 24, being sized and configured for reduced recompression for obtaining the relatively low desired values of static temperature which results from correspondingly low values of static pressure.

Since the fuel/air mixture 68 in the preferred embodiment will not undergo spontaneous ignition, means for igniting the fuel/air mixture 68 for sustaining recombination reactions of the fuel/air mixture 68 for generating the combustion gases 70 in the combustor 38 are required. One method step for igniting the fuel/air mixture 68 includes generating a boundary layer 72 of the ambient airflow 58 which extends over the bow and forebody surfaces 24 and 20 and into the inlet 34 and the combustor 38 as illustrated in FIGS. 2 and 3. The boundary layer 72 includes atomic oxygen generated in the boundary layer 72 in part due to the relatively high static temperatures thereof, which may be represented as follows:

$$O_2 + N_2 \rightarrow O + O + N_2$$

where molecular oxygen and nitrogen are transformed into atomic oxygen and molecular nitrogen. The method further includes the step of channeling the boundary layer 72 into the combustor 38 near the fuel injector 50 for mixing with a portion of the fuel 56 and generating a boundary layer fuel/oxygen mixture 74 subject to spontaneous ignition. The method further includes using the spontaneously ignited boundary layer fuel/oxygen mixture 74 for igniting the fuel/air mixture 68.

The igniting means, therefore, comprises the inlet 34 being sized and configured for generating the boundary layer 72, having atomic oxygen, over the bow and forebody surfaces 24 and 20 and channeling the boundary layer 72 through the inlet 38 to the combustor and mixing it with a portion of the fuel 56.

Analysis indicates that about 3% to about 4%, although higher percentages are also desirable, of the total inlet oxygen contained in the airflow entering the inlet 34 is atomic oxygen (O) as opposed to molecular oxygen ($O_2$), which is a relatively large amount of atomic oxygen generated in the boundary layer airflow 72 of the forebody 20 during operation of the aircraft 10 at hypersonic speeds. Analysis also indicates that the thickness of the boundary layer 72 in the inlet 38 is up to about five inches. The atomic oxygen in combination with a portion of the fuel 56, which in the preferred embodiment is hydrogen $H_2$, reacts in fast ignition, or chain, reactions as follows:

$$O + H_2 \rightarrow H + OH$$

$$OH + H_2 \rightarrow H_2O + H$$

$$H + O_2 \rightarrow OH + O$$

The above fast ignition reactions illustrate that the atomic oxygen reacts with the molecular hydrogen for creating chain reactions of the atomic oxygen and the fuel which generate additional atomic oxygen as well as hydroxile radicals OH and molecular hydrogen H which are used in the recombination reaction described above.

For comparison purposes, conventional spontaneous ignition of a fuel/air mixture such as the fuel/air mixture 68 using hydrogen occurs at relatively high static temperature greater than about 3000° R. and may be described by the following reaction expressions:

$$O_2 + H_2 \rightarrow OH + OH$$

$$OH + H_2 \rightarrow H_2O + H$$

Accordingly, the ignition reactions associated with the present invention are functionally different than the ignition reactions which would otherwise occur from spontaneous ignition of the fuel/air mixture 68 at relatively high static temperature.

Another significant advantage of the present invention is that following ignition and heat release at relatively low initial static pressure and static temperature of the fuel/air mixture 68 in the combustor 38, the combustor 38 itself serves as the primary means for pressure rise as opposed to the inlet 34. This follows from the thermodynamic principle that heat release in supersonic flow results in an increase in static pressure which may be represented by the following expression:

$$dP/P \alpha (kM^2[1+(K-1)M^2/2])/(M^2-1)(dT_0/T_0)$$

Where, k equals the conventionally known ratio of specific heat, M equals the Mach number velocity, dP/P equals rate of static pressure rise, and $dT_0/T_0$ equals rate of heat release. Accordingly, the rate of pressure rise dP/P is proportional to the rate of heat release $dT_0/T_0$, which, as described previously, is proportional to $P^3/T^5$.

In order to more fully appreciate the significance of operation of the present invention over a conventional scramjet engine the following tables are provided:

TABLE 1

|      | H     | L       |
|------|-------|---------|
| P    | 11.2  | 6.3     |
| T    | 3017  | 1860    |
| V    | x     | x + 483 |
| %    | 0     | 0       |
| Rate | 1.0   | 2.0     |

TABLE 2

|      | H    | L       |
|------|------|---------|
| P    | 13.2 | 21.0    |
| T    | 5230 | 5250    |
| V    | X    | X + 257 |
| %    | 40   | 62      |
| Rate | 0.10 | 0.41    |

TABLE 3

|      | L    |
|------|------|
| P    | 13.2 |
| T    | 4880 |
| V    | —    |
| %    | 66   |
| Rate | 0.15 |

TABLE 4

|      | H     | L     |
|------|-------|-------|
| P    | 2.93  | 2.93  |
| T    | 4050  | 3700  |
| V    | —     | —     |
| %    | 51    | 76    |
| Rate | 0.004 | 0.006 |

TABLE 5

|     | H   | L       |
|-----|-----|---------|
| V   | x   | x + 630 |
| CFG | 1.0 | 1.0     |
| ISP | 1.0 | 2.42    |

The above tables compare analytically determined performance of a conventional high pressure cycle labeled "H" and the low pressure cycle labeled "L" of the present invention. It should be noted that the relatively low desired static temperature is associated with a correspondingly relatively low absolute pressure. In the above tables, "P" represents absolute pressure in pounds per square inch absolute (psia), "T" represents static temperature in degrees Rankine (°R.), "V" is the velocity of the fluid flow expressed in feet per second relative to the velocity in the high pressure cycle H as represented by the value X, "%" represents the percent combustion completed at the respective position, "Rate" compares the rate of combustion at the respective positions relative to an initial combustion rate of 1.0 for the high pressure cycle H, "CFG" represents the relative coefficient of gross thrust, and "ISP" represents the relative specific impulse of the engines.

Tables 1-5 provide values at positions 1-5, respectively, as illustrated in FIG. 3. The values in the tables for the low pressure cycle L represent values for the scramjet engine 12 in accordance with the present invention as illustrated in FIG. 3, and the values for the high pressure cycle H are associated with a scramjet engine substantially identical to the scramjet engine 12 except for required changes in the bow surface 24, forebody surface 20, inlet 34 and combustor 38 for obtaining the values of static pressure and static temperature indicated in the tables.

Position 1 represents conditions in the combustor 38 just prior to combustion and also represents the values of the static pressure and static temperature of the supersonic compressed airflow 34 channeled into the combustor 38 from the inlet 34 after mixing with the fuel 56. Table 1 indicates that the static pressure P of the fuel/air mixture 68 is about 6.3 psia in accordance with the invention as compared to almost twice that pressure in the conventional high pressure cycle H of about 11.2 psia. The corresponding static temperature T in accordance with the exemplary embodiment of the invention is about 1860° R. which is substantially lower than the 3017° R. occurring in the high pressure cycle H. The percent combustion % at position 1 is zero for both cycles, and it is seen that the combustion Rate of the low pressure cycle L in accordance with this exemplary embodiment of the invention is twice as great as the combustion rate of the high pressure cycle H. The relative velocity V of the fuel/air mixture 68 is about 480 feet per second greater in the low pressure cycle L than compared to the velocity in the high pressure cycle H which is an indication of a substantial increase in net thrust due to the present invention.

Also at position 1, and at the values of static pressure P and static temperatures T occurring in the low pressure cycle L, atomic oxygen in the boundary layer 72 of at least about 2% of the total inlet oxygen is preferred for obtaining substantially spontaneous fast ignition reactions as described above.

At position 2 in the combustor 38, it is noted that combustion in the low pressure cycle L is about 62% complete as compared to about 40% complete in the high pressure cycle H which is due to the relatively higher rate of combustion in the low pressure cycle L. Static temperature of the combustion gases 70 have reached maximum temperatures of 5250° R. in the low pressure cycle L and 5230° R. in the high pressure cycle H which are generally equal. A substantial pressure increase has occurred in the combustor 38 as indicated by the static pressure 21.0 psia as compared to a static pressure of 13.2 psia in the high pressure cycle H.

When comparing position 1 and 2 in the combustor 38, it is seen that a pressure rise representing a difference between 21.0 and 6.3 of about 14.7 psia has been created in the combustor 38 which is substantially greater than the pressure rise created in the inlet 20 which has a maximum value of about 6.3 psia.

Accordingly, the combustor 38 is effective for pressurizing the combustion gases 70 to create a pressure rise thereof greater than the pressure rise created by compression of the ambient airflow in the inlet 34. This pressure rise is due to the recombination reaction of the fuel/air mixture 70 as represented by the expressions described above. The recombination occurs at temperatures ranging from a predetermined temperature of about 1860° R. which is below the temperature of about 3000° R. required for spontaneous ignition of the fuel/air mixture 68, and the recombination occurs up to about an upper temperature of about 5250° R. limited by dissociation of the combustion gases 70.

Table 3 merely illustrates that the combustion process is slowing down and the static pressures and temperatures of the combustion gases 70 are decreasing.

Table 4 illustrates that combustion is substantially complete since the relative combustion Rate is substantially close to a zero value for both the high pressure and low pressure cycles H and L. Table 4 also indicates that there is no distinct point for the end of the combustor 38 proper and beginning of the exhaust nozzle 40 and that these two elements of the scramjet engine 12 structurally and functionally overlap. Table 4 indicates also that the static pressure of the combustion gases 70 are generally equal and have relatively low values for both the low pressure cycle L and the high pressure cycle H. Most significantly, low pressure cycle L in accordance with the present invention results in substantially more combustion of the fuel/air mixture 68 than would occur in the conventional high pressure cycle H. The combustor 38 is accordingly sized for obtaining up to about 76% combustion, or recombination of the fuel/air mixture 38 as indicated in Table 4 for position 4.

Table 5 represents the conditions in the exhaust nozzle 40 and illustrates that the relative velocity of the combustion gases 70 in the low pressure cycle L are substantially greater (+630 feet per second) than those associated with the high pressure cycle H. The relative thrusts coefficients CFG are equal to each other, but, most importantly, the relative specific impulse ISP of the low pressure cycle L in accordance with the present invention is over twice that associated with the high pressure cycle H. The 2.42 relative specific impulse ISP indicates a substantial net thrust increase due to the low pressure cycle L in accordance with the present invention.

The values for low and high pressure cycles L and H shown in Tables 1 through 5 are intended to be representative of mechanisms described in this invention, i.e., ignition from atomic oxygen and pressure rise from combustion heat release. The degree of propulsion benefit achieved from the low pressure cycle L also depends on other factors such as atmospheric air density, flight Mach number, design of the inlet shock system, and boundary layer losses.

Accordingly, it is seen that the scramjet engine 12 in accordance with the present invention, results in static temperature and pressure at the inlet of the combustor 38 which are below spontaneous ignition limits and provide higher heat release before reaching dissociation limits and can also obtain high recombination rates. Furthermore the boundary layer airflow 72 can provide atomic oxygen for providing spontaneous ignition of the boundary layer fuel/oxygen mixture 74 for igniting the fuel/air mixture 68. The resulting high heat release in the combustor 38 provides the high pressure needed to complete full combustion in an acceptable length of the combustor 38.

While there have been described herein what are considered to be preferred embodiments of the present invention, other modifications of the invention shall be apparent to those skilled in the art from the teachings herein. And it, therefore, desired to be secured in the appended claims all such modifications as fall within the true spirit and scope of the invention.

More specifically, and for example, other means for igniting the fuel/air mixture 68 may be provided instead of using the boundary layer 72 with atomic oxygen.

Accordingly, what is desired to be secured by Letters Patent of the United States is the invention as defined and differentiated in the following claims:

1. A method of operating a scramjet engine for powering an aircraft, said engine including in series flow communication an inlet, combustor, and exhaust nozzle, comprising the steps of:
    providing supersonic compressed airflow from said inlet to said combustor;
    supplying fuel to said compressed airflow in said combustor and generating a fuel/air mixture having a predetermined temperature less than a temperature required for spontaneous ignition of said fuel/air mixture;
    igniting said fuel/air mixture for sustaining recombination reactions of said fuel/air mixture for generating combustion gases; and
    discharging said combustion gases from said combustor and through said exhaust nozzle for generating thrust.

2. A method according to claim 1 wherein said inlet comprises a supersonic diffuser.

3. A method according to claim 1 wherein said inlet further includes a forebody surface of said aircraft and said airflow providing step further includes generating oblique shockwaves from said forebody surface for predeterminately compressing ambient airflow for providing said supersonic compressed airflow to said combustor.

4. A method according to claim 1 wherein said inlet further includes a forebody surface of said aircraft and a bow surface of said aircraft extending upstream from said forebody surface at an obtuse angle thereto and said airflow providing step further includes generating oblique shockwaves from said bow and said forebody surfaces for compressing ambient airflow for providing said supersonic compressed airflow to said combustor.

5. A method according to claim 1 wherein said supersonic compressed airflow providing step provides said airflow at a predetermined temperature less than about 3000° R., and at a predetermined pressure.

6. A method according to claim 5 wherein said predetermined temperature is about 1860° R. and said predetermined pressure is about 6.3 psia.

7. A method according to claim 1 wherein said igniting step comprises:
    generating a boundary layer of airflow having atomic oxygen;
    channeling said boundary layer into said combustor for mixing with a portion of said fuel and generating a boundary layer fuel/oxygen mixture subject to spontaneous ignition; and
    using said boundary layer fuel/oxygen mixture for igniting said fuel/air mixture.

8. A method according to claim 7 wherein said boundary layer generating step generates atomic oxygen representing up to about 4% of total oxygen in said inlet.

9. A method according to claim 7 wherein said inlet further includes a forebody surface of said aircraft and a bow surface of said aircraft extending upstream from said forebody surface at an obtuse angle thereto and said airflow providing step further includes generating oblique shockwaves from said bow and said forebody surfaces for compressing ambient airflow for providing said supersonic compressed airflow to said combustor and for generating said boundary layer airflow.

10. A method according to claim 7 wherein said igniting step further comprises generating said boundary layer fuel/oxygen mixture for creating chain reactions of said atomic oxygen and said fuel for generating additional atomic oxygen.

11. A method according to claim 10 wherein said fuel is molecular hydrogen $H_2$ and said step for creating chain reactions creates atomic oxygen, atomic hydrogen H and hydroxile radicals OH.

12. A method according to claim 1 wherein said supersonic compressed airflow providing step includes compressing ambient airflow in said inlet to create a pressure rise for creating said supersonic compressed airflow; and further including pressurizing said combustion gases to create a pressure rise in said combustor; said combustor pressure rise being greater than said inlet pressure rise.

13. A method according to claim 12 wherein said inlet includes a forebody surface and a bow surface and said compressing step includes generating oblique shockwaves from said bow and forebody surfaces for increasing pressure of said ambient airflow by recompression.

14. A method according to claim 12 wherein said combustor pressurizing step includes using recombination reactions of said fuel/air mixture to increase pressure.

15. A method according to claim 14 wherein said recombination step occurs at temperatures ranging from said predetermined temperature below spontaneous ignition up to about an upper temperature limited by dissociation of said combustion gases.

16. A method according to claim 15 wherein said predetermined temperature is below about 3000° R. and said upper temperature is about 5250° R.

17. A method according to claim 15 wherein said predetermined temperature is about 1860° R. and said upper temperature is about 5250° R., and static pressures associated with said predetermined and upper temperatures are about 6.3 psia and about 21 psia, respectively.

18. A method according to claim 14 wherein said combustor pressurizing step includes up to about 76% recombination of said fuel/air mixture.

19. A method according to claim 1 wherein:
said inlet further includes a forebody surface of said aircraft and a bow surface of said aircraft extending upstream from said forebody surface at an obtuse angle thereto;
said airflow providing step further includes generating oblique shockwaves from said bow and said forebody surfaces for compressing ambient airflow to create a pressure rise in said inlet for providing said supersonic compressed airflow to said combustor, and for generating a boundary layer airflow having atomic oxygen for said igniting step; and
said igniting step further includes channeling said boundary layer into said combustor for mixing with a portion of said fuel and generating a boundary layer fuel/oxygen mixture subject to spontaneous ignition and using said boundary layer fuel/oxygen mixture for igniting said fuel/air mixture; and further including
pressurizing said combustion gases to create a pressure rise in said combustor, said combustor pressure rise being greater than said inlet pressure rise, and said combustor pressurizing step including using recombination reactions of said fuel/air mixture up to about an upper temperature limited by dissociation of said combustion gases to increase pressure.

20. A method according to claim 19 wherein said predetermined temperature is less than about 3000° R.

21. A method according to claim 19 wherein said predetermined temperature is about 1860° R., said upper temperature is about 5250° R.; static pressures associated with said predetermined and upper temperatures are about 6.3 psia and about 21 psia, respectively; and said atomic oxygen is at least about 2% of total oxygen in said inlet.

22. A scramjet engine for powering an aircraft at hypersonic speeds comprising:
an inlet effective for channeling supersonic compressed airflow;
a combustor disposed in flow communication with said inlet;
means for supplying fuel to said supersonic compressed airflow in said combustor for generating a fuel/air mixture having a predetermined temperature less than a temperature required for spontaneous ignition of said fuel/air mixture;
means for igniting said fuel/air mixture for sustaining recombination reactions of said fuel/air mixture for generating combustion gases in said combustor; and
an exhaust nozzle for discharging said combustion gases from said combustor for generating thrust for powering said aircraft.

23. A scramjet engine according to claim 22 wherein said inlet comprises a supersonic diffuser.

24. A scramjet engine according to claim 22 wherein said inlet further includes a forebody surface of said aircraft effective for generating oblique shockwaves for predeterminately compressing ambient airflow for providing said supersonic compressed airflow to said combustor.

25. A scramjet engine according to claim 22 wherein said inlet further includes a forebody surface of said aircraft and a bow surface of said aircraft extending upstream from said forebody surface at an obtuse angle thereto, said forebody and aft surfaces being effective for generating oblique shockwaves for compressing ambient airflow for providing said supersonic compressed airflow to said combustor.

26. A scramjet engine according to claim 22 wherein:
said combustor includes a throat;
said fuel supplying means includes a fuel injector disposed at said combustor throat; and
said inlet is sized and configured for channeling said supersonic airflow to said combustor throat at a predetermined pressure and temperature.

27. A scramjet engine according to claim 26 wherein said predetermined temperature is less than about 3000° R.

28. A scramjet engine according to claim 22 wherein said igniting means comprises:
said inlet including a forebody surface and being sized and configured for generating a boundary layer airflow over said forebody surface having atomic oxygen;
said combustor including a midbody surface extending downstream from said forebody surface;
said fuel supplying means including a fuel injector at a forward end of said midbody surface so that a portion of said fuel mixes with said boundary layer airflow for generating a boundary layer fuel/oxygen mixture subject to spontaneous ignition for igniting said fuel/air mixture.

29. A scramjet engine according to claim 28 wherein said inlet is sized and configured for generating a boundary layer airflow having atomic oxygen representing up to about 4% of total oxygen in said inlet.

30. A scramjet engine according to claim 28 wherein said inlet further inlcudes a bow surface of said aircraft extending obliquely upstream from said forebody surface and said bow and forebody surfaces are effective for generating oblique shockwaves for providing recompression of said ambient airflow for providing said supersonic compressed airflow to said combustor and for generating said boundary layer airflow.

31. A scramjet engine according to claim 28 wherein said igniting means is effective for creating chain reactions of said atomic oxygen and said fuel for generating additional atomic oxygen.

32. A scramjet engine according to claim 31 wherein said fuel is molecular hydrogen $H_2$ and said igniting means is effective for creating chain reactions which create atomic oxygen, atomic hydrogen H, and hydroxile radicals OH.

33. A scramjet engine according to claim 22 wherein:
said inlet is effective for creating a pressure rise by increasing pressure of ambient airflow for creating said supersonic compressed airflow;
said combustor is effective for creating a pressure rise by increasing pressure of said combustion gases; and
said combustor pressure rise is greater than said inlet pressure rise.

34. A scramjet engine according to claim 33 wherein said inlet includes a forebody surface and a bow surface extending upstream from said forebody surface, and said inlet is sized and configured for generating bow and forebody oblique shockwaves for increasing pressure of said ambient airflow by recompression.

35. A scramjet engine according to claim 33 wherein said combustor is effective for increasing pressure of said combustion gases by recombination reactions of said fuel/air mixture.

36. A scramjet engine according to claim 35 wherein said recombination reactions occur at temperatures ranging from said predetermined temperature below spontaneous ignition up to about an upper temperature limited by dissociation of said combustion gases.

37. A scramjet engine according to claim 35 wherein said predetermined temperature is less than about 3000° R. and said upper temperature is about 5250° R.

38. A scramjet engine according to claim 35 wherein said predetermined temperature is about 1860° R., said upper temperature is about 5250° R., and static pressures associated with said predetermined and upper temperatures are about 6.3 psia and about 21 psia, respectively.

39. A scramjet engine according to claim 35 wherein said combustor is sized for obtaining up to about 76% recombination of said fuel/air mixture.

40. A scramjet engine according to claim 22 wherein:
said combustor includes a midbody surface of said aircraft;
said exhaust nozzle includes an afterbody surface of said aircraft extending downstream from said midbody surface.

41. A scramjet engine according to claim 22 wherein:
said inlet further includes a forebody surface of said aircraft and a bow surface of said aircraft extending upstream from said forebody surface at an obtuse angle thereto for generating oblique shockwaves from said bow and said forebody surfaces for compressing ambient airflow in said inlet to create a pressure rise for providing said supersonic compressed airflow to said combustor and for generating a boundary layer airflow having atomic oxygen;
said inlet being effective for channeling said boundary layer into said combustor for mixing with a portion of said fuel and generating a boundary layer fuel/oxygen mixture subject to spontaneous ignition for igniting said fuel/air mixture; and
said combustor is effective for pressurizing said combustion gases by using recombination reactions of said fuel/air mixture up to about an upper temperature limited by dissociation of said combustion gases to create a pressure rise in said combustor, said combustor pressure rise being greater than said inlet pressure rise.

42. A scramjet engine according to claim 41 wherein said predetermined temperature is less than about 3000° R.

43. A scramjet engine according to claim 41 wherein said predetermined temperature is about 1860° R., said upper temperature is about 5250° R., and static pressures associated with said predetermined and upper temperatures are about 6.3 psi and about 21 psi, respectively.

* * * * *